United States Patent
Dupont et al.

(10) Patent No.: US 7,020,346 B2
(45) Date of Patent: Mar. 28, 2006

(54) METHOD FOR THE REMOVAL OF SCRATCHES FROM DIGITAL IMAGES

(75) Inventors: Jean-Fabien Dupont, Chalon sur Saone (FR); Christophe E. Papin, Paris (FR)

(73) Assignee: Eastman Kodak Company, Rochester, NY (US)

( * ) Notice: Subject to any disclaimer, the term of this patent is extended or adjusted under 35 U.S.C. 154(b) by 697 days.

(21) Appl. No.: 10/266,184

(22) Filed: Oct. 7, 2002

(65) Prior Publication Data

US 2003/0068096 A1   Apr. 10, 2003

(30) Foreign Application Priority Data

Oct. 10, 2001   (FR) .................................. 01 13004

(51) Int. Cl.
*G06K 9/40*   (2006.01)

(52) U.S. Cl. ....................... 382/275; 382/260; 382/274; 358/3.26; 358/463

(58) Field of Classification Search ................ 382/252, 382/260, 274, 275; 358/3.26, 3.27, 463
See application file for complete search history.

(56) References Cited

U.S. PATENT DOCUMENTS

| | | | | |
|---|---|---|---|---|
| 5,097,521 A | * | 3/1992 | Massmann | 382/266 |
| 5,179,419 A | | 1/1993 | Palmquist et al. | |
| 5,589,887 A | * | 12/1996 | Wischermann | 348/616 |
| 5,606,631 A | * | 2/1997 | Weiss et al. | 382/275 |
| 5,673,336 A | * | 9/1997 | Edgar et al. | 382/167 |
| 5,987,187 A | * | 11/1999 | Wischermann | 382/275 |

FOREIGN PATENT DOCUMENTS

GB   2317296 A   3/1998

\* cited by examiner

*Primary Examiner*—Jingge Wu
*Assistant Examiner*—Yosef Kassa
(74) *Attorney, Agent, or Firm*—David A. Norais

(57) ABSTRACT

The present invention is in the field of imaging and more specifically image analysis. An object of the invention is to provide for a method which restores a digitized image or a series of digitized images automatically, by eliminating straight or virtually straight scratches in the images. The method of the invention eliminates scratches in still or animated digital images by using the residual image information in the altered areas of the images. This method can be used in the field of the restoration of films and television documents and for retouching and restoring photographic images.

6 Claims, 1 Drawing Sheet

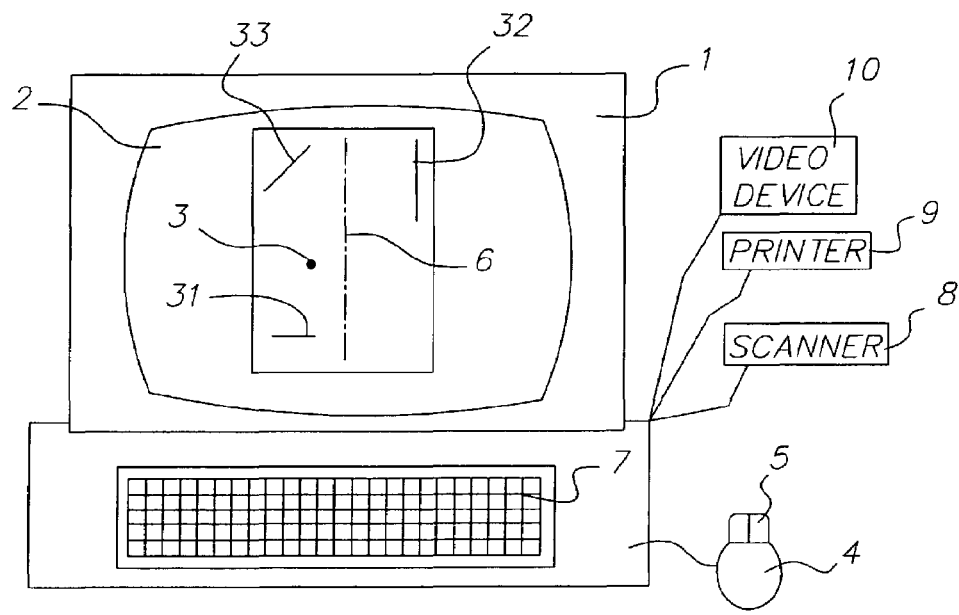
FIG. 1
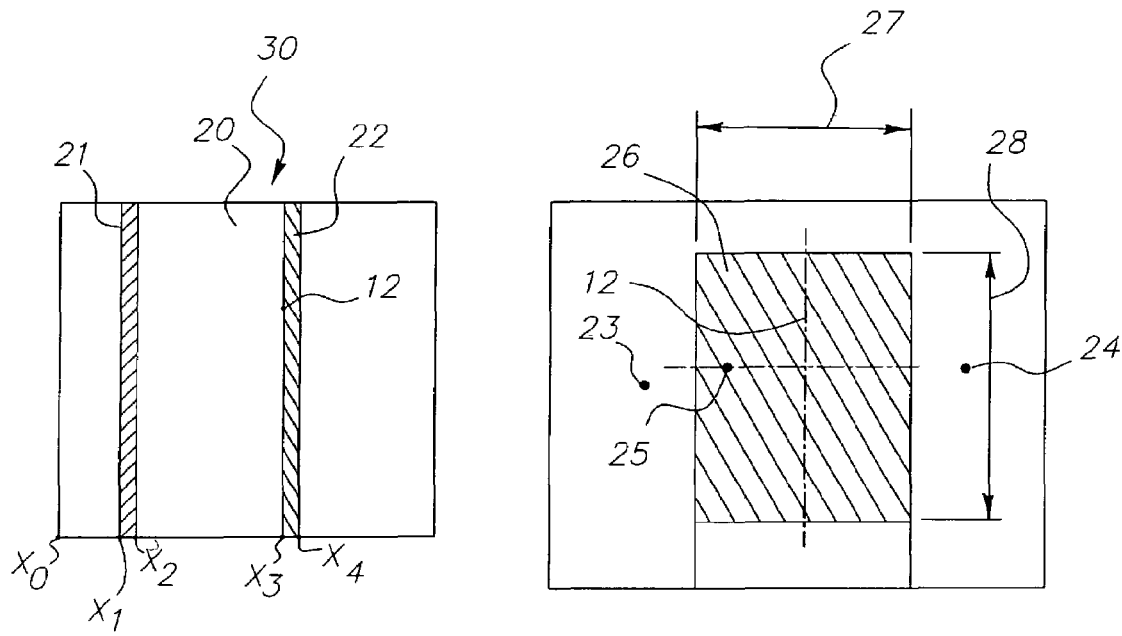
FIG. 2
FIG. 3

METHOD FOR THE REMOVAL OF SCRATCHES FROM DIGITAL IMAGES

This is a U.S. original application which claims priority on French patent application No. 0113004 filed Oct. 10, 2001.

FIELD OF THE INVENTION

The present invention is in the technological field of imaging and more specifically image analysis. The present invention more specifically concerns a method which automatically restores an image or a series of images by eliminating straight or virtually straight scratches found on such images. Scratches are defects that alter the original image.

BACKGROUND OF THE INVENTION

In the field of imaging, images recorded on conventional supports may be renovated or restored by processing a previously digitized version of these images. The conventional supports for such images generally include film, photographic paper or magnetic tape. Restoration of these images recovers the representation of the original image, which may have been damaged because of aging for example, or other damage due to the processing or handling of the photographic paper, film or magnetic supports. The images to be restored may be still or animated. Still images are generally photographs representing, for example, people landscapes or photographs of prints (drawings, tables, etc.). Animated images are generally film sequences; for example motion pictures or video sequences, for example from televised documents or amateur videos. Digital restoration methods known to those skilled in the art, generally includes digitizing the image originally recorded on a silver, film or magnetic support, and then processing the original digitized image to restore it. Such methods include transforming the original digitized image according to instructions given by the algorithms of the image processing software. The now transformed or restored digitized image can be memorized and used later in digital form or, for example, printed out on film or photographic paper.

Several techniques for the restoration or elimination of scratches in digital images are known to those skilled in the art and have been published. Methods for eliminating scratches are generally used to restore motion pictures. The disclosure of the following articles may be quoted as examples: "Detection and removal of line scratches in motion picture films" (authors: B. Besserer, S. Boukir, O. Buisson, L. Joyeux), pages 548 to 553, published in June 1999, CVPR'99, IEEE International Conference On Computer Vision and Pattern Recognition, Fort Collins, Colo. "Computerized motion picture restoration system" (authors: M. N. Chong, S. Kalra, S. Krishnan, A. Laud), pages 153 to 159, published in June 1998, Broadcast Asia International Conference, Singapore. Or "Restauration automatique de films anciens" (author: E. Decencière-Ferrandière), thesis paper published in November 1997, Ecole Normale Supérieure des Mines in Paris. Such methods may be used to remove scratches from a digitized image, but they are not capable of fully restoring such images. Furthermore, they are often rather slow when used for films containing high-resolution images: resolution being the density of points or lines (expressed as pixels per centimeter, for example).

The article "Film line scratch removal using Kalman filtering and Bayesian restoration" (authors: B. Besserer, S. Boukir, L. Joyeux), published in December 2000, WACV'2000, IEEE Workshop on the Application of Computer Vision, Palm Springs, Calif., describes a method for the automatic elimination of vertical scratches in sequences of digital images (video, film). Two processes are performed in succession: restoration is first carried out at low resolution through the use of cubic polynomial interpolation, the parameters of which are estimated using the method of least squares. Restoration is then completed by high-resolution analysis, exploiting statistical models based on Markovian fields and associated with a decision-making criterion of the Maximum A Posteriori (MAP) type. This space-time method is relatively complex and uses a large number of parameters.

Scratches can be restored in an average time of approximately 2 seconds per scratch.

The processes used in the methods above do not generally use the residual information likely to be present in each of the altered areas of the image to restore it. The residual information of the image is that part of the original signal (including the grain) which has not been affected by deterioration due to scratching. The methods used are therefore based on the hypothesis that the image data is missing. The missing digital data correspond to the intensity of the pixels of the image on the scratch. Therefore, these methods use mathematical models (probabilistic for example) of greater or less complexity; they are often based on a space-time analysis (for example, the use of data from the image before and after the image affected by scratches), and require the use of special, costly hardware (Silicon Graphics or Sun workstations, for example). The fact of not using the residual signal in the altered areas of the image, makes the restoration method random and more or less effective, depending on the texture (homogeneity of the intensity of the gray levels or colors) of the altered image on the scratch of the image.

The disadvantage of such methods that do not use or exploit the residual information in the scratch area is that they do not take into account the real alteration of the coat of emulsion containing the original image. This makes such restoration methods relatively ineffective and time consuming; for example, it may be necessary to add grain after restoring the texture of the original image in the altered area. A significant spatial extension of scratches in an image and their persistence in time, in the case of sequences of animated images, makes the human eye particularly sensitive to such scratches. In particular, scratches made on successive images, which are non-homogenous in texture, of a copy of film being projected may be detected by the human eye, even after restoration using these older techniques. Such restoration methods do not generally take into account the residual information of the image in the altered areas and are not therefore robust enough. Therefore, the human eye will still detect scratches the elimination of which after restoration is more or less effective. For example, experience shows that in a sequence of several dozen animated images projected in a few seconds, the human eye remains sensitive to the slightest trace of scratching.

SUMMARY OF THE INVENTION

It is an object of the present invention to provide a method which automatically eliminates straight or virtually straight scratches that have altered an original image or a series of original images. The method of the present invention eliminates scratches in still or animated digital images by using the residual image information in the affected areas of the images. The invention enables a user of the method to not perceive any scratches when the restored image is viewed. The present invention concerns an automatic, real time restoration method for at least one original digitized image that has been altered by one or more straight or virtually straight scratches, by providing detection masks or the coordinates of the areas of the image to be restored and which correspond to the scratches. The method comprises the following steps:

a) calculating and recording for each line of pixels in the area to be restored perpendicular to the theoretical axis of the scratch, the absolute value of the difference in intensity between the two pixels on the line of pixels, immediately to the left and right of the area to be restored, outside the area.

b) calculating and recording for each line of pixels in the area to be restored, the width and height of a working area which represents an area of pixels centered around the line of pixels; the width being approximately that of the area to be restored and the height depending on the values calculated in step a);

c) calculating and recording for each column of pixels in the working area defined in step b) parallel to the theoretical axis of the scratch, the average value of the respective intensity of the pixels forming the column of pixels in the altered image;

d) calculating and recording, by linear interpolation perpendicular to the theoretical axis of the scratch between the pixels immediately to the left and right of the area to be restored defined in step a), the local value of the intensity of the estimated, characteristic profile of the scratch, for each pixel in the line of pixels in the working area;

e) calculating and recording the local corrected intensity value for each pixel in the line of pixels in the working area, by subtracting the value obtained in step d) from the value of the intensity of the pixel in the altered image, so as to restore the original image automatically.

One of the advantages of the present invention is that it uses the residual information in the altered image, information at the location of the scratch that altered the image. This is the only operating requirement of the invention method; it requires a signal that corresponds to the residual information in the image. In other words, the invention takes into account the real profile of the scratch which may be random, depending on the alteration of the image. The invention enables us to analyze the intensity of the grain in the scratch area. This information is important and makes the invention more robust than previous techniques. Another advantage of the method of the present invention is that it only uses spatial analysis and not time-based analysis. This results in relatively short image restoration times (approximately one tenth of a second or less per scratch) and the use of relatively inexpensive hardware. The method of the present invention enables a user with a terminal and a display screen to remove scratches from a restored image in virtually real time by implementing the method. The method may also be used to avoid retrieving scratches visible to the user when the restored image is viewed.

Other characteristics and advantages will appear on reading the following description, with reference to the drawings of the various figures.

BRIEF DESCRIPTION OF THE DRAWINGS

FIG. 1 is a diagram of the hardware used to implement the method of the present invention;

FIG. 2 is a diagram of an example of an image altered by scratches to be restored using the method of the present invention; and FIG. 3 is a diagram in addition to FIG. 2 and explains the implementation of the method of the present invention.

DETAILED DESCRIPTION OF THE INVENTION

The method of the present invention is used in various image processing and restoration operations. The invention is used to correct still or animated images digitized from photographic paper, film or magnetic tape. The invention is used particularly for the restoration of films (motion pictures, video sequences) and photographic images. The invention enables straight or virtually straight scratches to be removed from still or animated digital images, while retaining and exploiting the residual information in the altered image. The residual information in the altered area of the image corresponds to that part of the signal and original grain not damaged by the disturbance due to the scratches. This residual information lies therefore in the residual grain in the image at the location of the scratches. The silver structure of the emulsion of an original image obtained, for example, from a silver support is characterized by its grain. The residual grain corresponds to the structure of the scratched emulsion as opposed to the original grain prior to the alteration of the image. The term scratch refers to all defects of this type of scratch caused by an item outside the image for example, and which has damaged or altered the image.

FIG. 1 shows an example of the hardware used to implement the method of the present invention. A user wishing to restore one or more altered original images uses a terminal 1. Terminal 1 is, for example, a personal computer or PC which includes a display screen 2. The terminal 1 is interfaced with a keyboard 7 and a mouse 4 comprising a least one control button 5. The operating system of terminal 1 is for example Unix, Windows or Linux. These operating systems are all capable of recognizing peripherals such as a scanner or digitizer 8, printer 9 or any other device 10 connected to the PC 1, used to capture video data. The user who wants to analyze an original image or series of images digitizes the original image or series of images, for example, using scanner 8, especially if the support of the original image is a silver film or photographic paper support. The transformed image is therefore encoded into digital data. The digitized original image 3 may be viewed on the display screen 2 of the terminal 1. The digitized original image 3 is either a single image, or a subset of a sequence of images, or a set of independent images. The digitized original image 3 is then recorded or stored in the memory of the terminal 1. The user uses a detection result provided by software derived from an appropriate detection algorithm, which is capable of detecting any scratches in digitized image 3, which represents the original altered image.

The present invention is based on the hypothesis that the initial signal in the area to be restored in the image 3 is not completely lost but merely modified or affected by noise. In other words, the image still contains residual information. That is, where the scratch was made, for example, on the emulsion side of a silver support, the scratch has not removed all the emulsion or grain of the initial silver image. The scratch may also be made on the underside (opposite the emulsion) and in this case, all the emulsion and therefore the information, is retained. Furthermore, no hypothesis is made as to the signature or characteristic profile or the scratch. For example, the method takes into account light or dark, discontinuous or continuous, horizontal 31, vertical 32 or inclined 33 scratches in the image 3 to remove them. The vertical position corresponds to the position of the main axis 6 of the image 3. Therefore, all scratches parallel to the axis 6 are said to be vertical. The scratches removed by this invention method are straight or virtually straight. A virtually straight scratch is one where the maximum positional deviation of at least one of the pixels on the line that represents the real axis of the scratch in relation to its theoretical axis 12, is equal to or less than 3 pixels. The real axis of the scratch is the line that divides the scratch in two equal sections lengthwise. The theoretical axis 12 is the straight line closest to the real axis of the scratch. The scratches should be long enough to enable the restoration invention method to be applied correctly.

In general, the minimum value for the length of the scratch represents approximately 15% of the minimum dimension of the frame of the original altered image 3. The invention takes into account scratches generally equal to or less than 15 pixels wide to remove them. In other words, the method of the invention enables scratches equal to or less than 15 pixels wide to be removed. Before implementing the restoration method, the user advantageously uses the detection result provided automatically by an appropriate detection algorithm. The detection algorithm is used to display a binary image, as shown for example in FIG. 2. The term binary image means that each scratch appears clearly in the form of masks 21, 22, which represent the area to be restored. Masks 21, 22 define the position and shape (width, height) of the corresponding scratch in the image 3. According to a preferred embodiment, masks 21, 22 are rectangular. But the user, instead of using an automatic detection algorithm, may also process the damaged image manually on the display screen 2, then by manually defining masks 21, 22 of the scratches, using, for example, button 5 of a mouse 4. In other words, detection is carried out by the user, who manually delimits the areas to be restored, each of which corresponds to scratches that have altered the original image. For optimum implementation of the invention, the width of the masks 21, 22 is approximated with a width very slightly greater than the width of the masked scratch, so as to just cover the scratch. Restoration or the implementation of the method is performed using masks 21, 22. Information concerning the shape and particularly the width and height of the mask, are saved automatically to a file. This file is saved to the memory of the terminal 1.

Furthermore, the method of the invention applies to each plane making up the digital image. If an image is encoded only in levels of gray, the method is only applied to one channel. But, for a color image encoded on three specific channels that correspond to the colors red, green and blue, the method applies to the images that correspond to red, green and blue respectively. The abrasion or alteration of the emulsion or silver film support, for example, may have various degrees of damage; for example, only one coat of an image in the film may be damaged, for example blue. Restoration is carried out on the blue but not the other (green, red) channels. But several layers of emulsion may have been altered or damaged in other images of the film and in this case, the method is applied using the residual information in each of the images. The method only uses the information in one image. This method is purely spatial, since it does not use time-dependent data from images before or after the image to be restored. The basic hypothesis that includes assuming that the initial signal still exists enables the original grain to be retained during restoration of the image, thus avoids digital reprocessing of the image later, for example, to add grain.

According to FIGS. 1, 2 and 3, the method of the invention enables scratches in a digital image 3 stored in the memory of the terminal 1 to be removed automatically. According to a preferred embodiment of the invention, the detection software used in the early stages of the restoration method of the invention provides, for example, a digitized image 30 that may be viewed on the display screen 2. The digitized image 30 corresponds to the display of the graphic representation of the detection result of the original, altered, and digitized image 3. The detection result image 30 is characterized by a background color or gray level 20 of the image 30 and by one or more other colors or levels of gray of the detection masks 21, 22. The detection masks are provided by appropriate detection software and correspond to the areas to be restored of the original image 3 altered by scratches.

The restoration method of the invention may also be used by entering a list of scratches characterized by the spatial coordinates of the areas to be restored in the image 30. These coordinates are then saved to the memory of the terminal 1. The calculation of the coordinates of a non vertical scratch, that is not parallel to or along the axis 6, is converted into a vertical scratch coordinate calculation by a coordinate changing system built into the algorithm of the method of the invention.

According to FIG. 2, the area to be restored that corresponds for example to the mask 21 is characterized by its horizontal coordinates $(x_1, x_2)$ in relation to the vertical, perpendicular direction of the axis 6 in the image 3 and in relation to an origin $x_0$. In general, origin $x_0$ is one of the pixels forming one of the corners of image 30; for example, we choose the lowest, leftmost pixel in the image. The area to be restored that corresponds to mask 22 is characterized by its horizontal coordinates $(x_3, x_4)$. The detection masks 21, 22 are graphic representations of the areas to be restored. The scratch is also characterized by its length, which is measured vertically, in parallel with the axis 6. According to FIG. 2, the scratches detected alter, for example, the entire height of the original image 3. Therefore, the detection masks that graphically represent the areas to be restored cross the entire height of the image 30, parallel to the axis 6. The width of the first scratch is approximately $x_2$ minus $x_1$ $(x_2-x_1)$ and that of the second scratch is approximately $x_4$ minus $x_3$ $(x_4-x_3)$. The scratches detected are processed and removed independently, one after the other. The restoration method is applied in succession to the mask 21, which corresponds to the first scratch detected then to the mask 22, which corresponds to the second scratch detected. The automatic restoration of scratches is carried out line by line in digital image 30.

The method of the invention enables the calculation and recording, for each line of pixels 25 of the detected scratch, of the absolute value of the difference in intensity between the two pixels 23, 24 located on the line of pixels and immediately to the left and right of the area to be restored, outside the area. The pixels 23, 24 are the pixels outside the detection mask closest to it, on either side of the vertical lines that determine the width 27 of the mask. For each line of pixels 25, it is the detection data entered which are used to determine the two pixels 23, 24 outside the area to be restored in the image and which delimit the area. The result of this operation, that is the absolute value of the differences in intensity between the two pixels 23, 24 on each line 25 of the image 30, is used to calculate and record for each line of pixels 25 of the mask 21, 22, the width 27 and the height 28 of a working area 26 centered on the line 25. The graphic representation 26 of the working area on the display screen 2 should preferably be rectangular. The horizontal extension or width 27 of the working area 26 corresponds to the width of the area to be restored determined during scratch detection. The calculation of the vertical extension or height 28 of the working area 26 depends on the similarity or homogeneity of the textures on each side of the scratch. If, for example, the textures of the original altered image 3 differ on either side of the areas to be restored 21 and 22, the vertical extension 28 will tend to be long. On the other hand, an area of uniform color, for example, in the original image 3 will generate a working area 26 with a low vertical extension.

According to a first embodiment of the method of the invention, the height 28 calculated for the working area 26 is directly proportional to the absolute value of the difference in intensity between the two pixels 23, 24 on the line of pixels 25, immediately to the left and right of the area to be restored and outside the area. A second embodiment of the invention method is used to calculate the height 28 by excluding the lines 25 for which the absolute value of the difference in intensity between the two pixels 23, 24 is equal to or greater than a given intensity threshold, which depends on the homogeneity of the texture of the original image. This exclusion eliminates, for example, the effects of the edge of an object in the image which produces a substantial difference in intensity. The height of the working area is generally within a window of 5 to 100 lines of pixels. The method is then used to calculate and record, for each column i of pixels in the working area 26, the value of the average intensity $\bar{I}_i$ of the respective intensities $I_i$ of the pixels of the column. All these average intensity values $\bar{I}_i$ are considered to be representative of the profile of the scratch processed on the current line 25, in the working area 26. The method is then used to calculate and record, by linear interpolation perpendicular to the theoretical axis of the scratch between the two pixels 23, 24 on either side of the area to be restored, the local value $\delta i$ of the intensity of the estimated and characteristic profile of the scratch, for each pixel on the current line 25 of the working area 26. $\delta i$ is calculated on the basis of the average intensity values calculated previously. $\delta i$ is calculated using the following formula:

$$\delta i = A_1(\bar{I}_i - \bar{I}_{n-1}) + A_2(\bar{I}_i - \bar{I}_0);$$

where:

$\bar{I}_0$ represents the value of the average intensity of the column of pixels containing the pixel 23;

$\bar{I}_i$ represents the value of the average intensity of any column i of pixels close to the working area;

$\bar{I}_{n-1}$ represents the value of the average intensity of the column of pixels ("$n^{th}$" column) containing the pixel 24; and $\delta i$ represents the correction to be made to intensity $I_i$ of the x axis pixel $x_i$ belonging to the line 25 in the working area 26. $A_1$ and $A_2$ are both weighting coefficients which take into account the horizontal position of pixels on the line 25 analyzed. $A_1$ and $A_2$ are obtained using the following formulae:

$$A_1 = (x_i - x_0)/(x_{n-1} - x_0);$$

$$A_2 = (x_{n-1} - x_i)/(x_{n-1} - x_0);$$

where:

$x_0$ represents the horizontal coordinate of the column of pixels containing the pixel 23;

$x_{n-1}$ represents the horizontal coordinate of the column of pixels ("$n^{th}$" column) containing the pixel 24; and $x_i$ represents the horizontal coordinate of any column i close to the working area.

The result of the linear interpolation provides the estimated, characteristic profile of the scratch on the line 25 concerned. The profile of the scratch is analyzed perpendicular to the theoretical axis 12 of the scratch. Using the interpolation result provided, the method of the invention is used to calculate and record the local corrected intensity value Ic for each pixel on the line of pixels in the working area, by subtracting the local value $\delta i$ of the intensity of the estimated profile of the scratch from value $I_i$ of the pixel in the altered image, so as to obtain the original, restored image 3 automatically and not retrieve any scratches visible to the user in the original, restored image when the restored image is viewed on the display screen 2 for example. The corrected value Ic is obtained using the following formula:

$$Ic = I_i - \delta i$$

The effective elimination of the scratch in the original image is therefore achieved by subtracting the estimated profile of the scratch from the intensities $I_i$ of the original altered or damaged image, for each line of pixels. The entire implementation of the invention restoration method enables scratches in the original, altered image to be removed virtually in real time. On average, the implementation of the invention restoration method enables one scratch to be removed from an image in less than one tenth of a second. According to one embodiment where the invention method is applied using, for example, a PC with a 450 MHz Pentium II processor, the restoration time for a scratch 1500 pixels high and 5 to 8 pixels wide in an original image of, for example, 3 million pixels (2000×1500 pixels) is less than one tenth of a second. The restoration invention method described preserves the original data close to the scratch together with any grain in the processed image.

When the image is restored to the user's preference, it may be saved to a digital file in the terminal 1. It may also be, for example, printed on paper, using a printer 9 connected to the terminal 1.

While the invention has been described with reference to the preferred embodiments, it is apparent that the present application covers all modifications or changes that can be made and which correspond with the object of the invention. Accordingly, such embodiments are given as illustrations and do not restrict the claimed protection.

The invention has been described in detail with particular reference to certain preferred embodiments thereof, but it will be understood that variations and modifications can be effected within the spirit and scope of the invention.

What is claimed is:

1. A method for automatically restoring in real time at least one digitized original image that has been altered by one or more straight or virtually straight scratches, by providing detection masks or coordinates of areas of the image to be restored which correspond to the scratches, the method comprising the steps of:

a) calculating and recording for each line of pixels in an area to be restored perpendicular to a theoretical axis of a scratch, an absolute value of a difference in intensity between two pixels located on said line of pixels, immediately to the left and right of the area to be restored, outside said area;

b) calculating and recording for each line of pixels in the area to be restored, a width and a height of a working area which represents an area of pixels centered around said line of pixels, said width being approximately that of the area to be restored and said height depending on the values calculated in said step a);

c) calculating and recording for each column of pixels in the working area defined in said step b) parallel to a theoretical axis of the scratch, an average value of respective intensity of the pixels forming said column of pixels in the altered image;

d) calculating and recording, by linear interpolation perpendicular to the theoretical axis of the scratch between the pixels located immediately to the left and right of the area to be restored defined in said step a), a local value of an intensity of an estimated profile and characteristic of the scratch, for each pixel in the line of pixels in the working area; and e) calculating and recording a local corrected intensity value for each pixel in the line of pixels in the working area, by subtracting the local value obtained in said step d) from the value of the intensity of said pixel in the altered image, so as to automatically restore the original image.

2. The method of claim 1, wherein a virtually straight scratch is one where a maximum positional deviation of at least one of the pixels on the line that represents a real axis of said scratch in relation to its theoretical axis, is equal to or less than 3 pixels.

3. The method of claim 1, wherein the height calculated for the working area is directly proportional to the absolute value of the difference in intensity calculated in said step a).

4. The method of claim 1, wherein the working area comprises lines for which an absolute value of the difference in intensity calculated in said step a) is less than a given intensity threshold, which depends on a homogeneity of a texture of the original image.

5. The method of claim 1, wherein the height of the working area is preferably included between 5 and 100 lines of pixels of the original image.

6. The method of claim 1, wherein a width of the straight or virtually straight scratch is equal to or less than 15 pixels.

* * * * *